United States Patent
Kwatra et al.

(10) Patent No.: US 11,495,211 B2
(45) Date of Patent: Nov. 8, 2022

(54) MEMORY DETERIORATION DETECTION AND AMELIORATION

(71) Applicant: International Business Machines Corporation, Armonk, NY (US)

(72) Inventors: Shikhar Kwatra, San Jose, CA (US); John D. Wilson, League City, TX (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 17/084,614

(22) Filed: Oct. 29, 2020

(65) Prior Publication Data

US 2022/0139375 A1 May 5, 2022

(51) Int. Cl.
  *G10L 15/07* (2013.01)
  *G10L 15/22* (2006.01)
  (Continued)

(52) U.S. Cl.
  CPC .......... *G10L 15/075* (2013.01); *G06F 16/901* (2019.01); *G06F 16/906* (2019.01);
  (Continued)

(58) Field of Classification Search
  CPC . G10L 15/075; G10L 15/22; G10L 2015/227; G10L 2015/228; G06F 16/906; G06F 16/901
  (Continued)

(56) References Cited

U.S. PATENT DOCUMENTS

| | | |
|---|---|---|
| 6,123,548 A | 9/2000 | Tallal et al. |
| 6,524,239 B1 | 2/2003 | Reed et al. |

(Continued)

FOREIGN PATENT DOCUMENTS

| | | |
|---|---|---|
| JP | 2019084249 A | 6/2019 |
| WO | 2017036516 A1 | 3/2017 |

(Continued)

OTHER PUBLICATIONS

Pendick, D., "7 Common Causes of Forgetfulness," [online] Harvard University © 2010-2020, Feb. 22, 2013, retrieved from the Internet: <https://www.health.harvard.edu/blog/7-common-causes-of-forgetfulness-201302225923>, 3 pg.

(Continued)

*Primary Examiner* — Susan I McFadden
(74) *Attorney, Agent, or Firm* — Cuenot, Forsythe & Kim, LLC

(57) ABSTRACT

Memory deterioration detection and evaluation includes capturing human utterances with a voice interface and generating, for a user, a human utterances corpus that comprises human utterances selected from the plurality of human utterances based on meanings of the human utterances as determined by natural language processing by a computer processor. Based on data generated in response to signals sensed by one or more sensing devices operatively coupled with the computer processor, contextual information corresponding to one or more human utterances of the corpus is determined. Patterns among the corpus of human utterances are recognized based on pattern recognition performed by the computer processor using one or more machine learning models. Based on the pattern recognition a change in memory functioning of the user is identified. The identified change is classified, based on the contextual (Continued)

information, as to whether the change is likely due to memory impairment of the user.

20 Claims, 6 Drawing Sheets

(51) Int. Cl.
*G06F 16/901* (2019.01)
*G06F 16/906* (2019.01)

(52) U.S. Cl.
CPC ........ *G10L 15/22* (2013.01); *G10L 2015/227* (2013.01); *G10L 2015/228* (2013.01)

(58) Field of Classification Search
USPC ........................................................ 704/243
See application file for complete search history.

(56) References Cited

U.S. PATENT DOCUMENTS

| | | | |
|---|---|---|---|
| 8,803,690 B2 | 8/2014 | Junqua et al. | |
| 9,177,257 B2 | 11/2015 | Kozloski et al. | |
| 9,251,712 B2 * | 2/2016 | Seymour | G09B 5/06 |
| 9,865,173 B2 * | 1/2018 | Seymour | G09B 5/06 |
| 10,152,988 B2 | 12/2018 | Kim et al. | |
| 10,799,186 B2 * | 10/2020 | Howard | A61B 5/7282 |
| 10,803,763 B2 * | 10/2020 | Seymour | G09B 5/00 |
| 2013/0059283 A1 | 3/2013 | Nagaoka et al. | |
| 2017/0105666 A1 | 4/2017 | Lee | |
| 2017/0213545 A1 | 7/2017 | Kwon et al. | |
| 2019/0015036 A1 | 1/2019 | Matsumura et al. | |
| 2019/0130895 A1 | 5/2019 | Qi et al. | |
| 2020/0234695 A1 | 7/2020 | Rao et al. | |

FOREIGN PATENT DOCUMENTS

| | | | |
|---|---|---|---|
| WO | 2017168907 A1 | 10/2017 | |
| WO | 2020023978 A2 | 1/2020 | |

OTHER PUBLICATIONS

Hashimoto, C. et al., "Detecting Absurd Conversations from Intelligent Assistant Logs by Exploiting User Feedback Utterances," in Proc. of 2018 World Wide Web Conference, Apr. 2018, pp. 147-156 (Abstract).

Malhotra, A. et al., "An exploratory study into the use of an emotionally aware cognitive assistant," in Workshops at the 29th AAAI Conf0 on Artificial Intelligence, Apr. 1, 2015, 6 pg.

"Do Memory Problems Always Mean Alzheimer's Disease?" [online] National Institute on Aging (NIA), part of the National Institutes of Health, retrieved Oct. 28, 2020, retrieved from the Internet: <https://www.nia.nih.gov/health/do-memory-problems-always-mean-alzheimers-disease>, 2 pg.

Well, P. et al., The NIST Definition of Cloud Computing, National Institute of Standards and Technology, U.S. Dept. of Commerce, Special Publication 800-145, Sep. 2011, 7 pg.

WIPO Appln. No. PCT/CN2021/116124, International Search Report and Written Opinion, dated Nov. 25, 2021, 9 pg.

\* cited by examiner

300

Capture a plurality of human utterances with a voice interface and generate, for a corresponding user, a corpus of human utterances comprising human utterances selected from the plurality of human utterances based on meanings of the human utterances, the meanings determined by natural language processing of the human utterances by a computer processor
302

Determine, based on data generated in response to signals sensed by one or more sensing devices operatively coupled with the computer processor, contextual information corresponding to one or more human utterances of the corpus
304

Recognize patterns among the corpus of human utterances based on pattern recognition performed by the computer processor using one or more machine learning models
306

Identify based on the pattern recognition a change in memory functioning of the user
308

Classify whether the change in memory functioning is likely due to memory impairment of the user based on the contextual information corresponding to one or more human utterances of the corpus
310

FIG. 3

MEMORY DETERIORATION DETECTION AND AMELIORATION

BACKGROUND

This disclosure relates to voice-based computer-human interaction, and more particularly, to voice-based computer-human interactions using artificial intelligence (AI).

AI-endowed computer systems are growing in number and complexity and often involve voice-based computer-human interaction. Voiced-based interactive systems are frequently found in home and other environments to effect control over automated devices and systems through voice prompts and commands. Voice-based interactive systems are used for myriad purposes beyond automation control. For example, using a voice-based interactive system, a user can inquire about the weather, acquire driving directions, search for a favorite song, and the like. A user can even request a reminder of something the user forgot, like where the user left a set of car keys.

SUMMARY

In one or more embodiments, a method includes capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor. The method includes determining based on data generated in response to signals sensed by one or more sensing devices operatively coupled with the computer processor contextual information corresponding to one or more human utterances of the corpus. The method includes recognizing patterns among the corpus of human utterances based on pattern recognition performed by the computer processor using one or more machine learning models. The method includes identifying based on the pattern recognition a change in memory functioning of the user. The method includes classifying, based on the contextual information corresponding to one or more human utterances of the corpus, whether the change in memory functioning is likely due to memory impairment of the user.

In one or more embodiments, a system includes a processor configured to initiate operations. The operations include capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor. The operations include determining based on data generated in response to signals sensed by one or more sensing devices operatively coupled with the computer processor contextual information corresponding to one or more human utterances of the corpus. The operations include recognizing patterns among the corpus of human utterances based on pattern recognition performed by the computer processor using one or more machine learning models. The operations include identifying based on the pattern recognition a change in memory functioning of the user. The operations include classifying, based on the contextual information corresponding to one or more human utterances of the corpus, whether the change in memory functioning is likely due to memory impairment of the user.

In one or more embodiments, a computer program product includes one or more computer readable storage media having instructions stored thereon. The instructions are executable by a processor to initiate operations. The operations include capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor. The operations include determining based on data generated in response to signals sensed by one or more sensing devices operatively coupled with the computer processor contextual information corresponding to one or more human utterances of the corpus. The operations include recognizing patterns among the corpus of human utterances based on pattern recognition performed by the computer processor using one or more machine learning models. The operations include identifying based on the pattern recognition a change in memory functioning of the user. The operations include classifying, based on the contextual information corresponding to one or more human utterances of the corpus, whether the change in memory functioning is likely due to memory impairment of the user.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of a method of memory monitoring and evaluation according to an embodiment.

DETAILED DESCRIPTION

Figure 1:
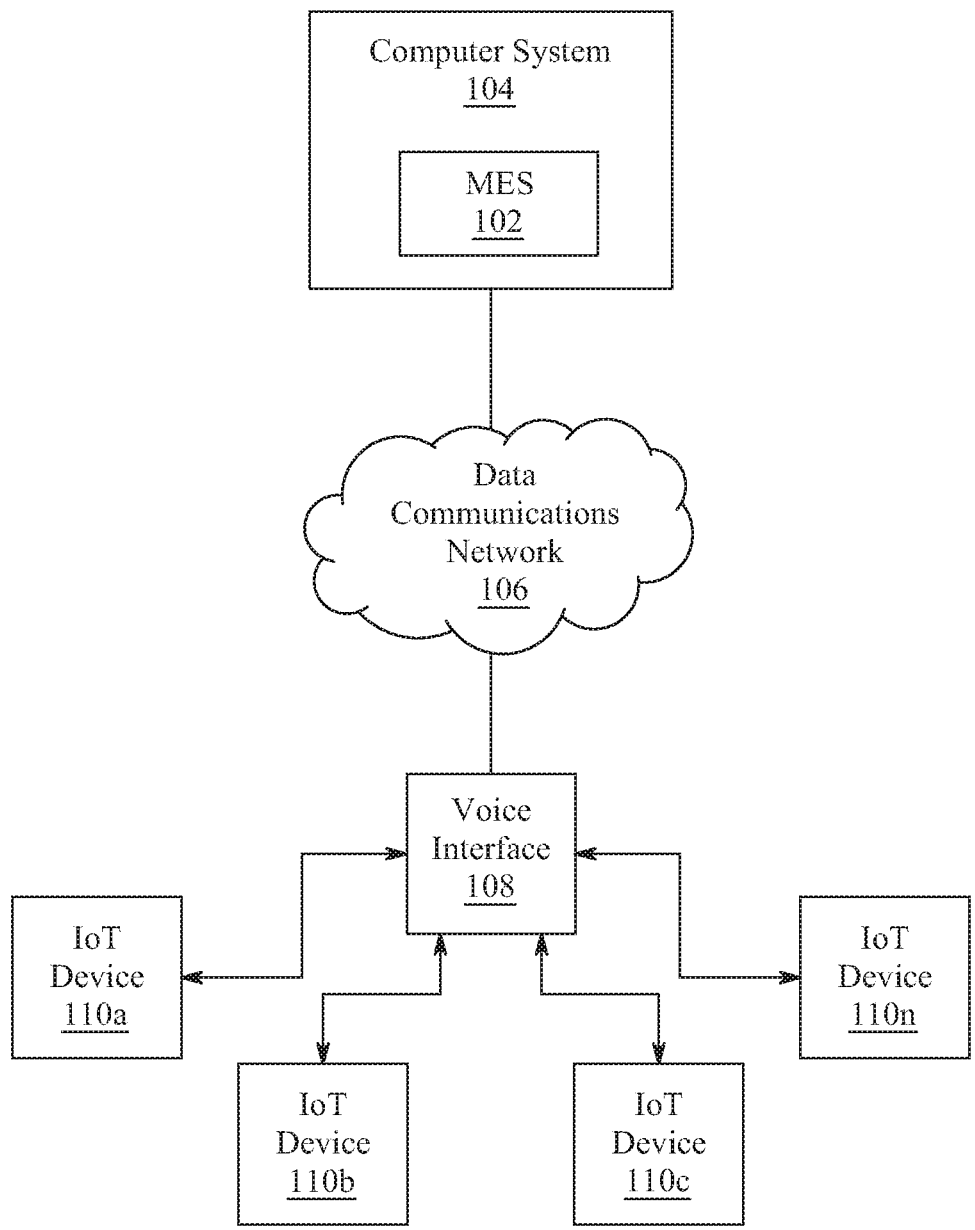
FIG. 1 depicts an example computing environment according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to voice-based computer-human interaction, and more particularly, to voice-based computer-human interactions using AI. Smart homes and similar environments typically include an AI voice response system, which implements natural language understanding (NLU) to create a human-computer interface with which linguistic structure and meaning can be machine-determined from human utterances. Acting through an interface such as a smart speaker comprising a speaker and intelligent virtual agent, the AI voice response system can control various Internet of Things (IoT) devices within the smart home or similar such environment by NLU processing of voice prompts and commands. The AI voice response system can also provide responses to user-specific queries (e.g., "where are my glasses?") and requests for general information (e.g., "what's today's date?").

An aspect of the systems, methods, and computer program products disclosed herein is the generation of a corpus of human utterances (e.g., user-specific and general requests) and the recognition of patterns within the corpus indicative of a pattern of forgetfulness of a user. Patterns of forgetfulness are recognized using one or more machine learning models that perform pattern recognition. Based on incremental monitoring and contextualizing of the content, frequency, and patterns of user utterances within the corpus, memory impairment of the user can be detected. As defined herein, "memory impairment" is a decline in an individual's ability to store and retrieve information and data due to a disease or condition that causes a long term or permanent change in the individual's brain structure and functioning. Accordingly, memory impairment is different from mere forgetfulness, which is due to a temporary condition (e.g., stress, fatigue, and/or distractions) and which recedes as the condition improves. Memory impairment, by contrast, is caused by a disease (e.g., Alzheimer's disease) or condition (e.g., age, brain injury) that causes a long-term (typically several years) or permanent deterioration in the individual's ability to store and retrieve information and data.

The user utterances can be contextualized based on sensor information captured by one or more IoT devices. The contextual information can be used to distinguish memory impairment from routine forgetfulness. In some embodiments, a human-computer dialogue, generated using machine learning and based on recognized patterns among the corpus of utterances, can be conducted with the user to distinguish memory impairment from routine forgetfulness.

Another aspect of the systems, methods, and computer program products disclosed herein is generation of an ameliorative action strategy. The strategy also can be determined based on a recognition of patterns among the utterances included in the corpus and corresponding to contextual information. An ameliorative action strategy can include automatically engaging the user at predetermined times (e.g., at night when disease effects are more pronounced) in an interactive machine-generated dialogue to assist the user in performing one or more tasks (e.g., reminding the user to take a medication and ensure that home appliances are off and doors locked). The dialogue can be machine generated based on contextual data and can be structured according to the nature of the user's memory impairment to calm or reassure a user.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 6:
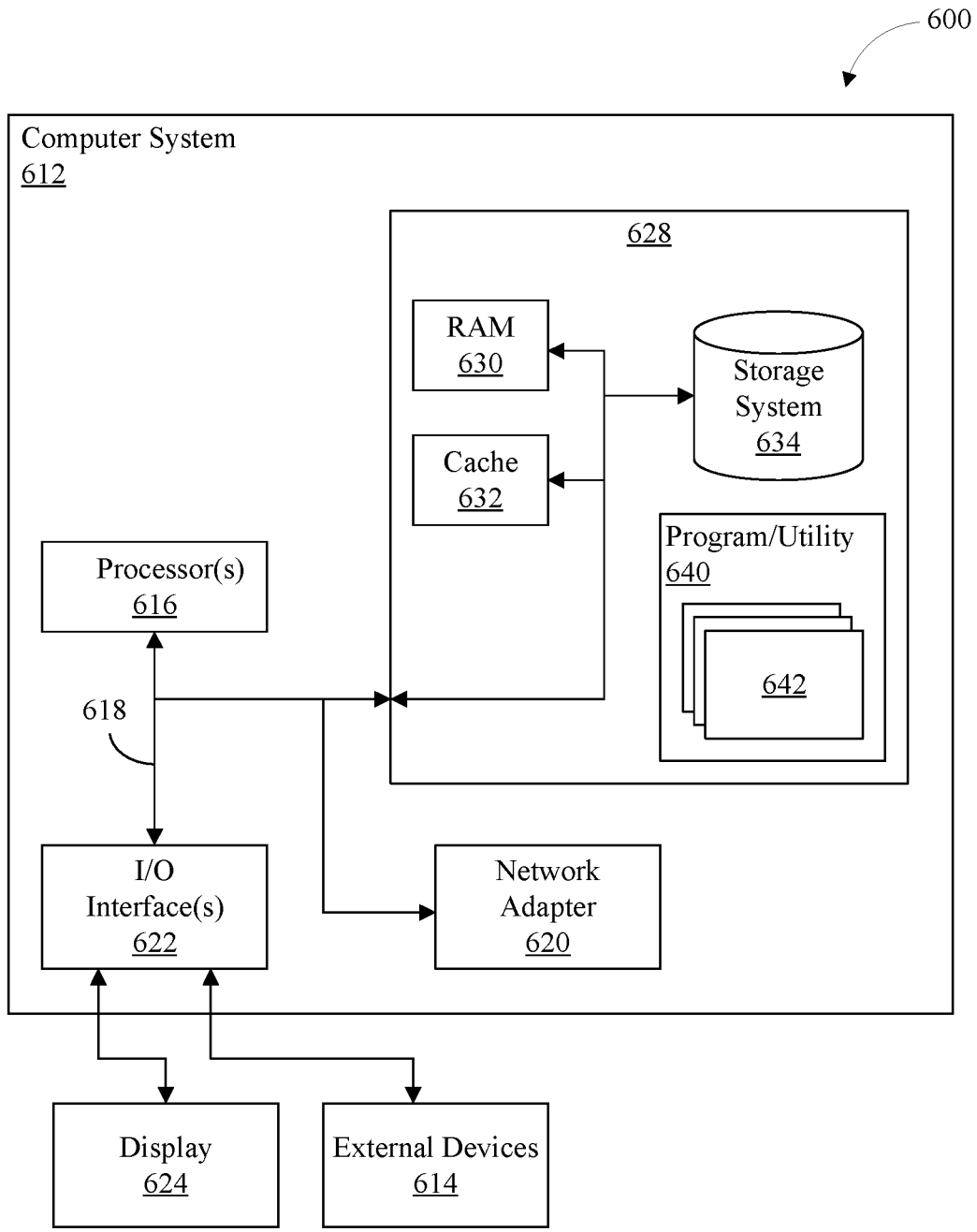
FIG. 6 depicts a cloud computing node according to an embodiment.

FIG. 1 depicts example computing environment 100. Computing environment 100 includes example memory evaluator system (MES) 102 according to one embodiment. MES 102 is illustratively implemented in software that is stored in a memory and executes on one or more processors of computer system 104. Computer system 104 can be part of a computing node (e.g., cloud-based server) such as computing node 600, which includes a computer system such as example computer system 612 (FIG. 6). Computer system 104 provides a platform for an AI voice response system. MES 102 is operatively coupled with or integrated in the AI voice response system that executes on computer system 104. In other embodiments, MES 102 executes on a separate computer system and is communicatively coupled with an AI voice response system operating on a different computer system. The AI voice response system connects via data communications network 106 to voice interface 108. Data communications network 106 can be, and typically is, the Internet. Data communications network 106 can be, or can include, a wide area network (WAN), local area network (LAN) or a combination of these and/or other types of networks and can include wired, wireless, fiber optic and/or other connections. Voice interface 108 can be, for example, a smart speaker that comprises a speaker and an intelligent virtual assistant that responds to human utterances (e.g., voice prompts and commands) interpreted by the AI voice response system.

The AI voice response system operating on computer system 104 provides a natural langue understanding (NLU) computer-human interface with which linguistic structure and meaning can be machine-determined from human utterances. Using machine learning, the AI voice response system can learn to recognize a user's unique voice characteristics (e.g., acoustic signal patterns) and voice commands and prompts conveyed via voice interface 108. Voice commands and prompts captured by voice interface 108 can select, create, and modify electronic memory-stored data to control one or more IoT devices, illustrated by IoT devices 110a, 110b, 110c, and 110n. IoT devices 110a-110n can communicate with voice interface 108 via wired or wireless (e.g., Wi-Fi, Bluetooth) connections. IoT devices 110a-110n can include, for example, smart appliances, climate controller, lighting system, entertainment system, energy monitors, and the like, which are part of a smart home or similar environment and which can be co-located with or remote from computer system 104.

Figure 2:
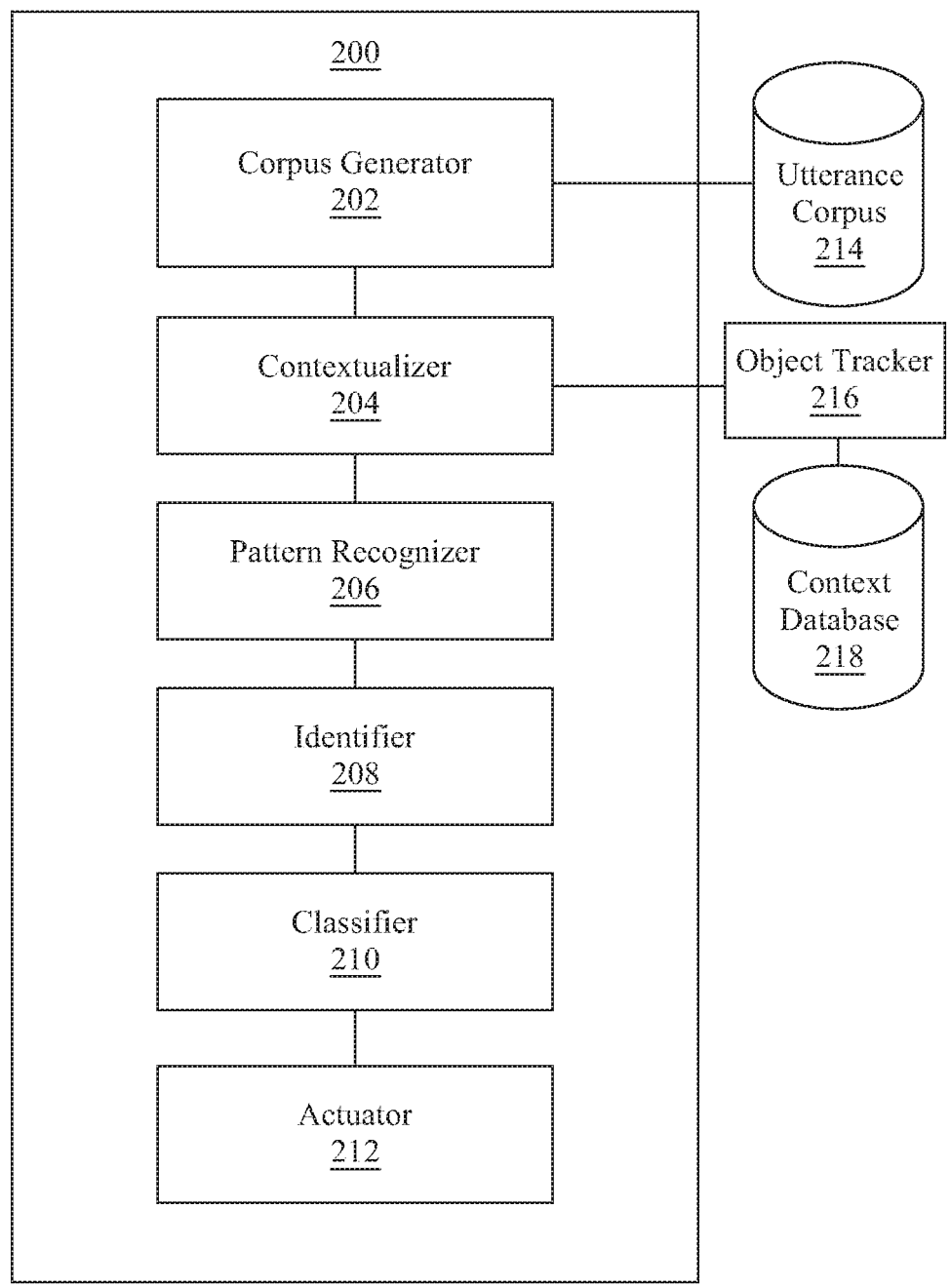
FIG. 2 depicts an example memory evaluator system according to an embodiment.

FIG. 2 depicts in more detail certain elements of MES 200 according to one embodiment. MES 200 illustratively includes corpus generator 202, contextualizer 204, pattern recognizer 206, identifier 208, and classifier 210. Corpus generator 202, contextualizer 204, pattern recognizer 206, identifier 208, and classifier 210 can each be implemented in software operatively coupled with or integrated in an AI voice response system. In other embodiments, corpus generator 202, contextualizer 204, pattern recognizer 206, identifier 208, and classifier 210 can be implemented in dedicated circuitry or a combination of circuitry and software configured to operate cooperatively with an AI voice response system.

Corpus generator 202 generates a corpus of human utterances corresponding to a user. The corpus is generated by corpus generator 202 selecting certain user utterances from among various human utterances captured by a voice interface (e.g., smart speaker) operatively coupled with the AI voice response system. The human utterances are selected by corpus generator 202 based on meanings of the utterances. The meanings of the utterances are determined by corpus generator 202 using natural language processing.

A context of one or more of the human utterances selected is determined by contextualizer 204 based on data generated in response to signals sensed by one or more sensing devices. The one or more sensing devices can comprise IoT devices that are operatively coupled to the voice interface and that are controlled with voice prompts and commands interpreted by the AI voice response system.

Pattern recognizer 206 performs pattern recognition for recognizing patterns in the corpus of human utterances. Pattern recognition is performed by pattern recognizer 206 based on one or more of the machine learning models. Based on the pattern recognition, identifier 208 identifies changes in the user's memory functioning. Classifier 210 applies the contextual data to classify whether an identified change in memory functioning of the user is a symptom of memory impairment. Optionally, in response to classifier 210 classifying an identified change in memory functioning of the user as a symptom of memory impairment, actuator 212 can initiate one or more ameliorative actions to mitigate the effects of memory impairment of the user.

User utterances can comprise individual words, phrases, and/or sentences spoken by the user of MES 200. The user is the individual whose voice is recognized by the AI voice response system that operates cooperatively with MES 200 and that is trained using machine learning to identify the user based on unique voice characteristics (e.g., acoustic signal patterns) corresponding to the user. The utterances are captured by the voice interface communicatively coupled to the AI voice response system and are conveyed to MES 200.

Corpus generator 202 selects from among human utterances specific ones in which the user poses a question (e.g., "where are my car keys?"), asks for information (e.g., "what is the weather like outside?"), or involves a recognizable aspect of memory or cognition of the user (e.g., "I can't remember the time of my appointment today"). Corpus generator 202 can select user utterances from conversations between the user and the AI voice response system. The user may say, for example, "I've lost my glasses," to which the AI voice response system may convey through the voice interface a machine-generated audio response, "are you wearing your glasses?" A statement such as "I've lost my glasses" is not a direct question. Only inferentially is the statement a question or a request for assistance. Nonetheless, corpus generator 202 can be trained using machine learning to include the utterance in the corpus.

Utterances, in some embodiments, also can be selected from conversations in which the user engages verbally with another individual and which is captured by the voice interface. In other embodiments in which MES 200 is communicatively coupled with a wireless and/or wired telephone system, corpus generator 202 can select user utterances from conversations conducted over a wireless or wired telephone connection. Corpus generator 202, in still other embodiments in which MES 200 is operatively coupled to a text messaging system (e.g., email), can select text-based messages involving a question, request for information, or another message identified as involving the user's cognition.

Selection of utterances by corpus generator 202 is based on the syntax and semantics of the utterances determined using natural language processing. Corpus generator 202 gains semantic understanding of the utterances by applying one or more machine learning models for understanding the content of utterances and selecting utterances based on the content.

In some embodiments, corpus generator 202 applies a bidirectional long-short term model (Bi-LSTM). A Bi-LSTM is in a sense a joinder of two recurrent neural networks (RNNs). An RNN comprises a network of nodes in which nodes are connected to form a directed graph, each node (input, output, and hidden) having a time-varying, real-valued activation function. The RNN "remembers" information through time rather than treating all inputs and output as independent, enabling the RNN to predict for, example, a next word in a sentence. The Bi-LSTM processes an ordered sequence in two directions, from past to future and from future to past. Running backwards the Bi-LSTM preserves information from the future and using a combination of two hidden states is able, at any point in time, to preserve the past and future information. The Bi-LSTM model can determine the content of utterances based on performing multi-hop reasoning across multiple utterances.

In other embodiments, corpus generator 202 determines semantic understanding using other machine or statistical learning models, such as non-latent similarity (NLS). NLS, for example, makes use of a second-order similarity matrix to determine semantic similarity between words, phrases, and sentences. Verbal units of utterances (e.g., words, phrases, sentences) are represented as vectors and the similarity between the utterances is measured by the cosine of the angle between each pair of vectors. Corpus generator 202 can use other machine or statistical learning models to determine content and meaning of user utterances. Using machine or statistical learning, corpus generator 202 can also identify the topic or topics of user utterances. Corpus generator 202 generates utterance corpus 214 by storing in electronic memory the user utterances selected based on the determined content and meaning.

Corpus generator 202 can also use natural language processing to perform sentiment analysis. Based on the sentiment analysis, corpus generator 202 can identify a state of mind of the user (e.g., angry, sad, frustrated, happy) corresponding to one or more selected user utterances.

Contextualizer 204 provides context to at least some of the selected user utterances. Contextual information can include a health condition of the user, the user's cognitive state, attentiveness, and the like. Contextualizer 204 can determine contextual information based on data provided via a signal feed (e.g., Wi-Fi, Bluetooth) from one or more IoT devices to an intelligent virtual assistant of the voice interface (e.g., smart speaker comprising a speaker and intelligent virtual assistant). Illustratively, contextualizer 204 receives contextual data obtained by object tracker (e.g., IoT camera) 216, which also constructs context database 218 by storing contextual data in electronic memory. Other IoT devices not explicitly shown can also generate signals in response to various types of sensing performed by the other IoT devices.

In some embodiments, contextualizer 204 determines contextual information based on context data that includes images and/or video captured by object tracker 216 (e.g., one or more IoT cameras). Using a convolutional neural network (CNN) that is trained to recognize and classify images and/or video, contextualizer 204 can provide a contextual meaning to an utterance captured by the voice interface. In certain embodiments, content and meaning of a user utterance is determined by a cooperative application of a Bi-LSTM model (implemented as described above) to determine content of an utterance and a regional-convolutional neural network (R-CNN) to identify one or more objects within images corresponding to the user utterance. The R-CNN can identify objects within an image by bounding regions within the image. A feature vector is extracted from each region by a deep CNN. A classifier identifies objects using a classifier (e.g., linear support vector machine (SVM)) applied to each feature vector. Contextualizer 204 can combine the Bi-LSTM model for determining meaning or content of a user utterance and an R-CNN for performing reverse reasoning hops with respect to captured images to generate contextual data corresponding to the utterance.

A relation between the user utterance and images can be determined by contextualizer 204 based on time and/or topic. For example, a machine-made comparison between timestamps corresponding, respectively to the time a user utterance was recorded and the time images were captured can reveal that the user utterance and event captured in the images occurred simultaneously or nearly simultaneously. Alternatively, both the bi-LSTM and R-CNN can identify topics of the user utterance and images, respectively. Contextualizer 204 can match user utterances with images according to the respective topics of each.

Pattern recognizer 206 recognizes patterns among the selected user utterances. Pattern recognition can be based on different factors. For example, pattern recognizer 206 recognizes patterns based on a factor such as the nature of the utterance (e.g., question, request for information, statement). The user may be looking for an object (e.g., glasses, keys). The user may be asking about a date or time. Such a question or statement may be repeated by the user. The number of times the question or statement is repeated during a predetermined interval may accelerate. Pattern recognizer 206 can recognize patterns based on the frequency or number of times during a predetermined time interval that the same or semantically similar utterances are repeated, determined using the NLS described above, for example, or other NLU processing. Pattern recognizer 206 is trained to recognize patterns using machine learning. For example, using a supervised learning model, pattern recognizer 206 can be trained using a collection of labeled feature vectors to recognize patterns of user forgetfulness. The labeled feature vectors used to train pattern recognizer 206 can comprise a collection of feature vectors corresponding to past utterances of the user. In other embodiments, the collection of labeled feature vectors corresponds to past utterances of multiple individuals who agree to jointly share such data.

Not all forgetfulness is a symptom of memory impairment. For example, asking the voice response system, "where did I put my umbrella?" three straight days in a row in which it rains each day is less likely due to memory impairment than, say, asking "what time is it?" six times in an hour. Identifier 208 combines patterns recognized by pattern recognizer 206 and corresponding contextual information generated by contextualizer 204 to identify the likely underlying cause of a pattern of forgetfulness recognized by pattern recognizer 206.

In some embodiments, MES 200 can automatically invoke a search for contextual information if the nature of an utterance is ambiguous or the significance of the utterance with respect to a user's forgetfulness is uncertain. A search of electronically stored contextual data can be initiated to identify contextual information to mitigate the uncertainty. For example, a statement such as "what happened to my key?" may not readily be recognized as a question about the location of the user's keys. Using a cascade model that combines the R-CNN and Bi-LSTM (each described above), an initial determination by the Bi-LSTM that the meaning is ambiguous can automatically invoke a search for contextual information, which the R-CNN provides by obtaining images (timestamped to coincide with the user uttering the statement) that show the user moving about the house looking for something. The confluence of utterance and contextual information (images) can resolve the ambiguity and demonstrate the nature of the utterance to be equivalent to "where are my keys?" Contextual information other than images can be provided by other IoT devices.

In performing searches for contextual information if the nature of an utterance is ambiguous or the significance of the utterance with respect to a user's forgetfulness is uncertain, MES 200 performs reasoning hops, moving bi-directionally (as described above) among electronically stored contextual data to resolve the ambiguity or uncertainty. If information needed is not obtained through reasoning hops within the corpus of contextual data, MES 200 can search and fetch needed data from one or more external IoTs. In the event MES 200, based on fetched data determines that the likelihood of the meaning meets a predetermined confidence level (e.g., 60% or greater), MES 200 does not search the contextual data to fetch additional information for resolving any ambiguity or uncertainty.

Identifier 208 based on contextual information generated by contextualizer 204 can identify one or more possible underlying reasons for a pattern of forgetfulness. A possible reason can be a user's underlying health condition rather than memory impairment. For example, a recognized pattern of forgetfulness during a given period may be due to the user taking a physician-prescribed medication that induces drowsiness. Contextual data generated by contextualizer 204 can include contextual data stored electronically in context database 218 that is based on input provided by the user or a caregiver that includes health-related parameters, such as medications the user is taking and the time of taking the medications such that the half-life (time span medication is effective), which can indicate an overlap in time with utterances indicative of forgetfulness. Identifier 208, accordingly, can identify that a possible reason for a pattern of forgetfulness recognized by pattern recognizer 206 is likely due to the health condition (e.g., drowsiness-inducing medication) rather than memory impairment.

Similarly, a recognized pattern of forgetfulness may be due to a temporary lack of attentiveness as, for example, if the user is occupied with on-going home repairs. Contextual data generated by contextualizer 204 can comprise images captured by object tracker 216 (e.g., one or more IoT cameras), which may show the user repeatedly being interrupted by workers engaged in making the repairs. Based on the contextual data, identifier 208 can identify that the possible reasons for a pattern of forgetfulness is inattentiveness due to the distraction of home repairs rather than memory impairment.

By contrast, a user may repeatedly ask, "where are my glasses?" Contextual data generated by contextualizer 204 can comprise images captured by object tracker 216 (e.g., one or more IoT cameras) that reveal that each time, or most of the times, the user asked the question, the user in fact was wearing the glasses.

Contextualizer 204 can generate contextual data that does not correspond to specific utterances but that nonetheless can provide identifier 208 information to identify a possible underlying reason for a pattern of forgetfulness recognized by pattern recognizer 206. For example, contextual data generated by contextualizer 204 can comprise images captured by object tracker 216 (e.g., one or more IoT cameras) that show the user placing a pair of reading glasses in the refrigerator. Identifier 208, also trained using machine learning, can identify the anomalous act by the user. When the images are coupled with earlier or subsequent utterances, even if only one or a few, stating "I've lost my glasses" or "where are my classes?" identifier 208 does not attribute a pattern of forgetfulness recognized by pattern recognizer 206 to a health condition, distraction, or other the like but instead identifies a likely symptom of forgetfulness.

Contextual information based on different signals generated by different sensing devices (e.g., sensor-embedded IoT devices) can include the user's attentiveness, cognitive state, and/or health conditions. Image-related contextual information can include a user's facial patterns, gestures, and/or movements within a given environment (e.g., smart home). External noises, weather conditions, and the like can also provide contextual information.

Even contextual information that does not relate to any specific utterances can be used by identifier 208 to identify a pattern of forgetfulness. For example, contextualizer 204 can generate contextual information from images captured by object tracker 216 (e.g., one or more IoT cameras) that show anomalous activity. Such activity, though not directly corresponding to a specific utterance, can correspond, for example, to the user attempting to perform an activity using a tool or object (e.g., IoT device) that is not intended to be used for performing the activity. For example, images captured by an IoT camera may show the user attempting to open a can of soup using an electric shaver or placing keys in a microwave. Based on a set of labeled training data drawn from experiences of individuals suffering from memory impairment, a machine learning model can identify acts frequently done by a sufferer. This type of contextual information can be used by classifier 210 to classify whether a change in memory functioning (indicated by more frequent forgetfulness) is likely due to memory impairment of the user.

Classifier 210 classifies changes in memory functioning evidenced by an accelerating repetition of user utterances (e.g., questions, requests for information, statements equivalent to a question or request for information) contained in the corpus generated by corpus generator 202. Corresponding contextual information that supports an inference that a recognized pattern of forgetfulness is due to ordinary lapses of memory weighs against classifying changes as due to memory impairment. Forgetfulness can be due to stress, fatigue, distractions, and the like. Contextual information, such as heart rate, respiratory rate or other biomarkers, that indicate conditions such as stress or fatigue can be captured by a device (e.g., a smartwatch) and wirelessly conveyed to MES 200 for electronically storing in context database 218. Context database 218 can likewise be supplied with contextual information indicative of distractions or user inattentiveness, such as images of workers performing repairs in the home or weather-related events outside the home that may distract the user. Such contextual information can indicate events or conditions that support an inference that the user's forgetfulness is temporary and not caused by memory impairment. A lack of contextual information to support an inference of temporary memory lapse, though, causes classifier 210 to classify changes in memory functioning as due to memory impairment. A default classification for classifier 210, in some embodiments, is to classify changes in memory functioning as due to memory impairment if there is no contextual information indicating that the changes merely reflect temporary lapses of memory.

In some embodiments, classifier 210 can implement a machine learning classification model, such as a deep learning neural network. The classification model can be trained using supervised learning applied to a collection of labeled feature vectors corresponding to different classes or categories of individuals. The model can be a binary classifier that classifies a user based on an input vector as afflicted with memory impairment or not afflicted. In some embodiments, the classification model can be a multi-classifier model that includes a non-afflicted class and multiple classes, each corresponding to a different disease. Classifier 210, depending on the underlying feature vectors used to train a multi-class classification model, can categorize a change in memory functioning likely due to memory impairment of the user according to a predicted severity impairment.

Corpus generator 202 in some embodiments uses crowdsourcing to populate the utterance corpus 214. Various statistical analyses can be performed based on the population comprising the corpus and used as a benchmark for classifying whether a user's change in memory functioning is likely due to memory impairment (e.g., whether the change deviates by more than a predetermined number of standard deviations from the population norm). A machine learning classification model can be generated using iterative reinforcement learning whereby the model is iteratively refined with increases in the size of the population of utterance corpus 214.

Optionally, MES 200 can include ameliorative action actuator 212 that devises an ameliorative action strategy in response to classifying a user's change in memory functioning as a symptom of memory impairment. The ameliorative action strategy includes engaging the user at predetermined times in an interactive machine-generated dialogue to assist the user in performing one or more tasks. For example, an ameliorative action strategy can involve tracking (e.g., using an IoT camera) the user's movement and generating (via the voice interface) a voice warning in the event that the user leaves on an appliance (e.g., stove) before preparing for bed. The reminder can be part of an interactive dialogue in which the user is asked whether the front door is locked and/or reminding the user how to perform some other activity to ensure user's safety. An ameliorative action strategy can include issuing a voice reminder at times that the user needs to take a medication or take another action. The ameliorative action strategy can include determining a current health condition of the user and generating an electronic notification advising the user to consult a health expert as warranted. The ameliorative action strategy can include generating an electronic notification and conveying the notification to a caregiver advising the caregiver of the user's likely memory impairment. The notification can be conveyed over a data communications network, wired network, or wireless communication network.

FIG. 3 is a flowchart of example method 300 of memory monitoring and evaluation according to an embodiment. Method 300 can be carried out using the same or similar systems as described with reference to FIGS. 1 and 2. At block 302, the system captures a plurality of human utterances with a voice interface and generates, for a corresponding user, a corpus of human utterances comprising human utterances selected from the plurality of human utterances based on meanings of the human utterances. The meanings of the human utterances are determined by natural language processing of the human utterances by a computer processor.

At block 304, the system determines, based on data generated in response to signals sensed by one or more sensing devices operatively coupled with the computer processor, contextual information corresponding to one or more human utterances of the corpus. The system at block 306 recognizes patterns among the corpus of human utterances based on pattern recognition performed by the computer processor using one or more machine learning models.

At block 308, the system identifies based on the pattern recognition a change in memory functioning of the user. Based on the contextual information corresponding to one or more human utterances of the corpus, the system at block 310 is capable of classifying whether the change in memory functioning is likely due to memory impairment of the user.

In some embodiments, the system classifies the change by engaging the user in an interactive machine-generated dialogue in response to classifying the change in memory functioning as a symptom of memory impairment.

In some embodiments, the system classifies the change by performing a behavior analysis of the user based on contextual information. In still other embodiments, the system classifies the change by performing sentiment analysis to determine a state of mind of the user. The sentiment analysis can determine based on the tone of an utterance and/or the specific words spoken that the user is angry, frustrated, or experiencing an emotion that can coincide with distractions or inattentiveness causing a user's a temporary diminishment of memory, rather than indicating memory impairment.

In other embodiments, the system determines contextual information by performing computer-based searching of a context database in response to an ambiguous utterance that may or may not correspond to a change in memory functioning of the user. The system can automatically invoke a search of a context database for contextual information if the nature of an utterance is ambiguous or the significance of the utterance with respect to a user's forgetfulness is uncertain.

Optionally, the system can construct an ameliorative action strategy in response to classifying the change in memory functioning as a symptom of memory impairment. In some embodiments, the ameliorative action strategy includes engaging the user at predetermined times in an interactive machine-generated dialogue to assist the user in performing one or more tasks. In other embodiments, the ameliorative action strategy includes generating an electronic notification advising the user to consult a health expert. In still other embodiments, the system alternatively or additionally generates an electronic notification and conveys the notification to a caregiver advising the caregiver of the user's possible memory impairment. The notification can be conveyed via a data communications network, a wired network, or a wireless network.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
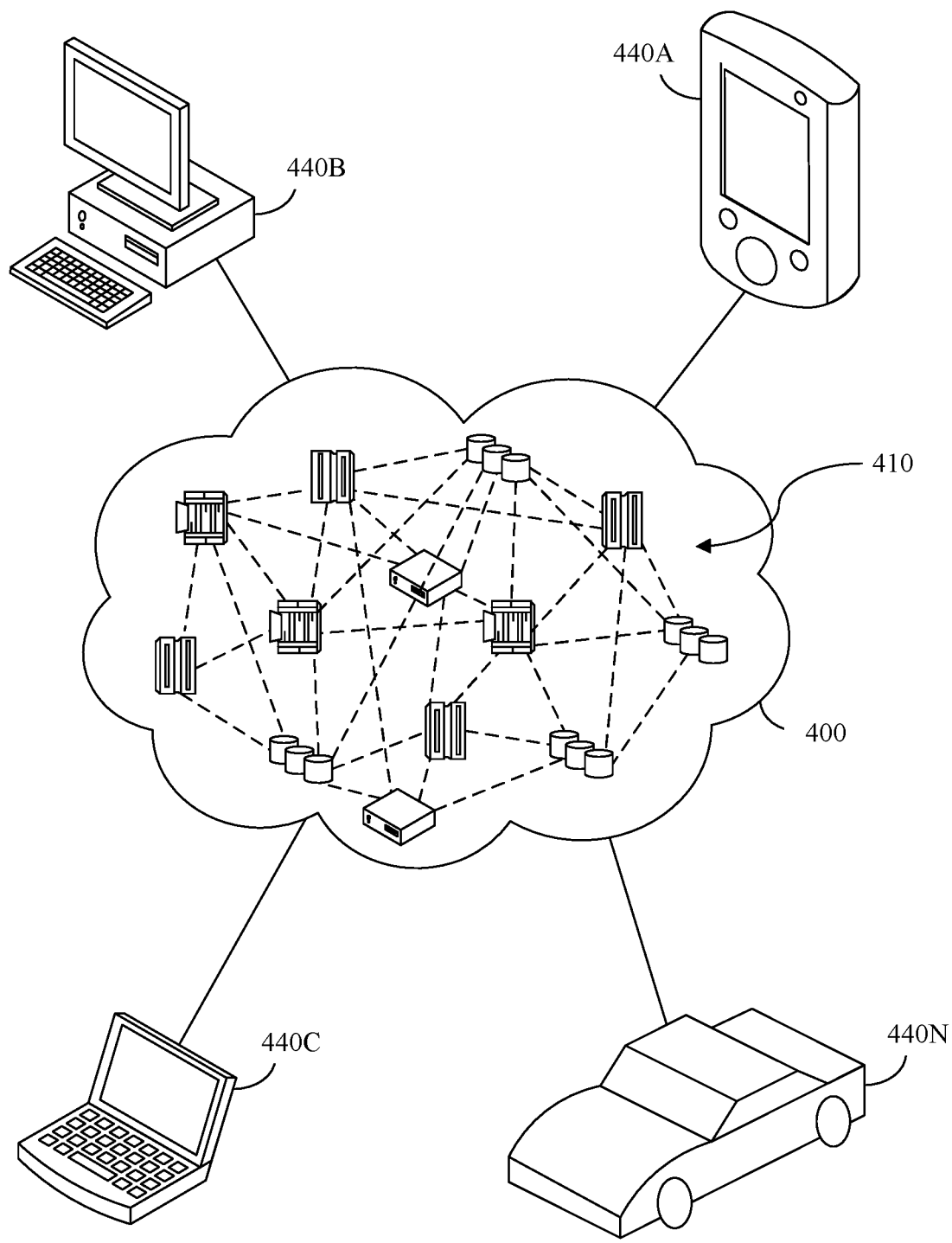
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
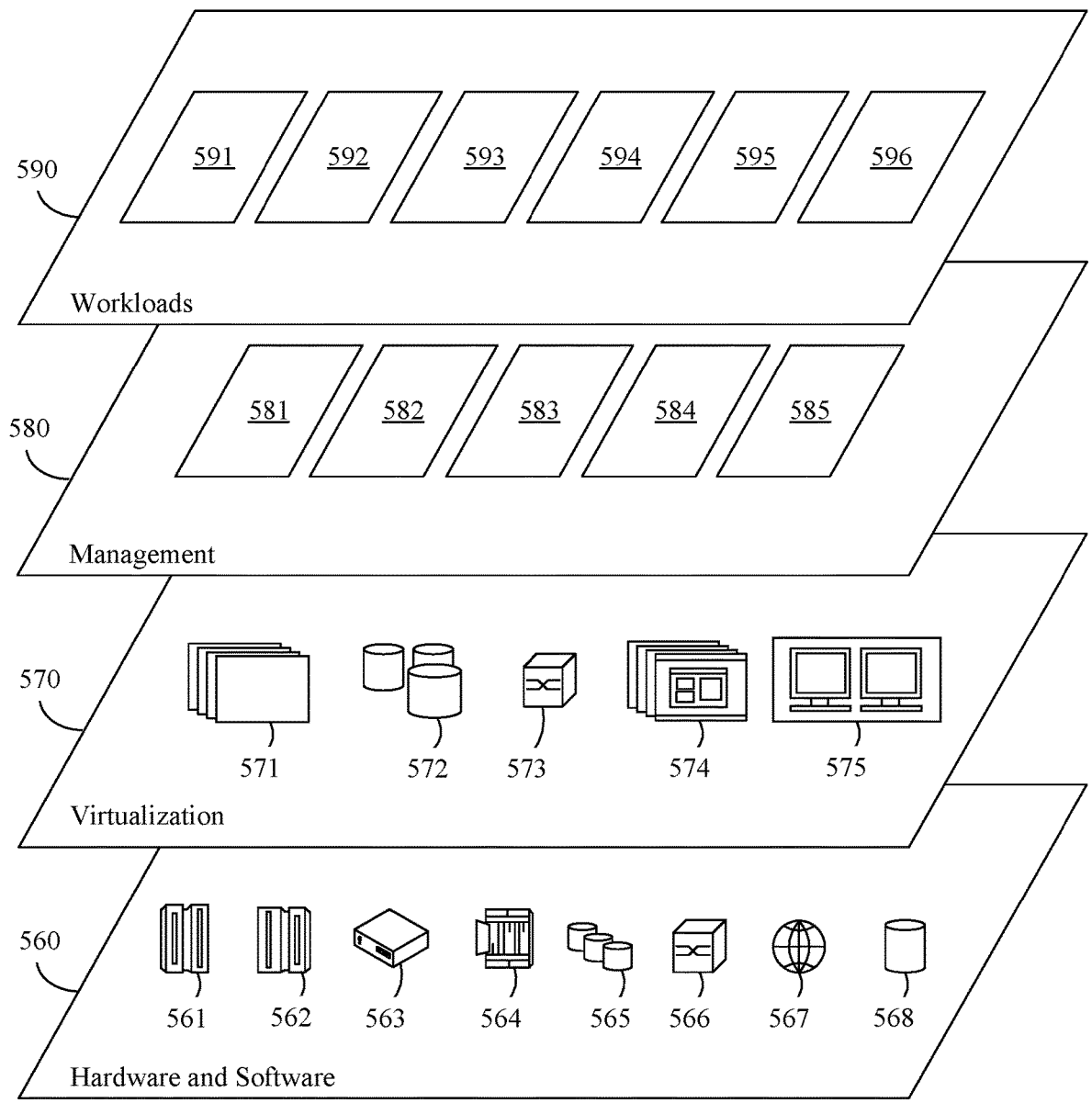
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and MES 596.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include MES 596 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising
capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor;
determining based on data generated in response to signals sensed by one or more sensing devices operatively coupled with the computer processor contextual information corresponding to one or more human utterances of the corpus;
recognizing patterns among the corpus of human utterances based on pattern recognition performed by the computer processor using one or more machine learning models;
identifying based on the pattern recognition a change in memory functioning of the user; and
based on the contextual information corresponding to one or more human utterances of the corpus, classifying whether the change in memory functioning is likely due to memory impairment of the user.

2. The method of claim 1, wherein the classifying includes engaging the user in an interactive machine-generated dialogue in response to classifying the change in memory functioning as a symptom of memory impairment.

3. The method of claim 1, wherein the classifying further includes performing at least one of behavior analysis or sentiment analysis to determine a state of mind of the user.

4. The method of claim 1, wherein the determining contextual information includes performing computer-based searching of a context database in response to an utterance whose meaning is ambiguous or the significance of the utterance with respect to a user's forgetfulness is uncertain.

5. The method of claim 1, further comprising constructing an ameliorative action strategy in response to classifying the change in memory functioning as a symptom of memory impairment.

6. The method of claim 5, wherein the ameliorative action strategy includes engaging the user at predetermined times in an interactive machine-generated dialogue to assist the user in performing one or more tasks.

7. The method of claim 5, wherein the ameliorative action strategy includes at least one of generating an electronic notification advising the user to consult a health expert or generating an electronic notification and conveying the notification to a caregiver advising the caregiver of the user's possible memory impairment.

8. A system, comprising
a processor configured to initiate operations including:
capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor;
determining based on data generated in response to signals sensed by one or more sensing devices operatively coupled with the computer processor contextual information corresponding to one or more human utterances of the corpus;
recognizing patterns among the corpus of human utterances based on pattern recognition performed by the computer processor using one or more machine learning models;
identifying based on the pattern recognition a change in memory functioning of the user; and
based on the contextual information corresponding to one or more human utterances of the corpus, classifying whether the change in memory functioning is likely due to memory impairment of the user.

9. The system of claim 8, wherein the classifying includes engaging the user in an interactive machine-generated dialogue in response to classifying the change in memory functioning as a symptom of memory impairment.

10. The system of claim 8, wherein the classifying further includes performing at least one of behavior analysis or sentiment analysis to determine a state of mind of the user.

11. The system of claim 8, wherein the determining contextual information includes performing computer-based searching of a context database in response to an utterance whose meaning is ambiguous or the significance of the utterance with respect to a user's forgetfulness is uncertain.

12. The system of claim 8, wherein the processor is configured to initiate operations further including constructing an ameliorative action strategy in response to classifying the change in memory functioning as a symptom of memory impairment.

13. The system of claim 12, wherein the ameliorative action strategy includes engaging the user at predetermined times in an interactive machine-generated dialogue to assist the user in performing one or more tasks.

14. A computer program product, the computer program product comprising:
  one or more computer-readable storage media and program instructions collectively stored on the one or more computer-readable storage media, the program instructions executable by a processor to cause the processor to initiate operations including:
    capturing a plurality of human utterances with a voice interface and generating, for a corresponding user, a corpus of human utterances comprising human utterances selected from the plurality of human utterances based on meanings of the human utterances, the meanings determined by natural language processing of the human utterances by a computer processor;
    determining based on data generated in response to signals sensed by one or more sensing devices operatively coupled with the computer processor contextual information corresponding to one or more human utterances of the corpus;
    recognizing patterns among the corpus of human utterances based on pattern recognition performed by the computer processor using one or more machine learning models;
    identifying based on the pattern recognition a change in memory functioning of the user; and
    based on the contextual information corresponding to one or more human utterances of the corpus, classifying whether the change in memory functioning is likely due to memory impairment of the user.

15. The computer program product of claim 14, wherein the classifying includes engaging the user in an interactive machine-generated dialogue in response to classifying the change in memory functioning as a symptom of memory impairment.

16. The computer program product of claim 14, wherein the classifying further includes performing at least one of behavior analysis or sentiment analysis to determine a state of mind of the user.

17. The computer program product of claim 14, wherein the determining contextual information includes performing computer-based searching of a context database in response to an utterance whose meaning is ambiguous or the significance of the utterance with respect to a user's forgetfulness is uncertain.

18. The computer program product of claim 14, wherein the program instructions are executable by the processor to cause the processor to initiate operations further including constructing an ameliorative action strategy in response to classifying the change in memory functioning as a symptom of memory impairment.

19. The computer program product of claim 18, wherein the ameliorative action strategy includes engaging the user at predetermined times in an interactive machine-generated dialogue to assist the user in performing one or more tasks.

20. The computer program product of claim 18, wherein the ameliorative action strategy includes at least one of generating an electronic notification advising the user to consult a health expert or generating an electronic notification and conveying the notification to a caregiver advising the caregiver of the user's possible memory impairment.

* * * * *